US012675986B2

(12) United States Patent
Nadamuni Raghavan et al.

(10) Patent No.: US 12,675,986 B2
(45) Date of Patent: Jul. 7, 2026

(54) RECONFIGURABLE, HYPERDIMENSIONAL NEURAL NETWORK ARCHITECTURE

(71) Applicant: SRI INTERNATIONAL, Menlo Park, CA (US)

(72) Inventors: Aswin Nadamuni Raghavan, Pennington, NJ (US); Michael R. Piacentino, Robbinsville, NJ (US); Michael A. Isnardi, Plainsboro, NJ (US); Indhumathi Kandaswamy, Yardley, PA (US); Saurabh Farkya, Princeton, NJ (US); David Chao Zhang, Belle Mead, NJ (US); Gooitzen S. Van Der Wal, Hopewell, NJ (US); Zachary Daniels, Robinsville, NJ (US); Yuzheng Zhang, Princeton, NJ (US)

(73) Assignee: SRI International, Menlo Park, CA (US)

( * ) Notice: Subject to any disclaimer, the term of this patent is extended or adjusted under 35 U.S.C. 154(b) by 347 days.

(21) Appl. No.: 18/282,049

(22) PCT Filed: Mar. 24, 2022

(86) PCT No.: PCT/US2022/021718
§ 371 (c)(1),
(2) Date: Sep. 14, 2023

(87) PCT Pub. No.: WO2022/204384
PCT Pub. Date: Sep. 29, 2022

(65) Prior Publication Data
US 2024/0185591 A1 Jun. 6, 2024

Related U.S. Application Data

(60) Provisional application No. 63/166,213, filed on Mar. 25, 2021.

(51) Int. Cl.
| | | |
|---|---|---|
| *G06V 10/82* | (2022.01) | |
| *G06N 3/0442* | (2023.01) | |
| *G06V 10/764* | (2022.01) | |

(52) U.S. Cl.
CPC ........... *G06V 10/82* (2022.01); *G06N 3/0442* (2023.01); *G06V 10/764* (2022.01)

(58) Field of Classification Search
CPC .... G06V 10/82; G06V 10/764; G06N 3/0442; G06N 3/088; G06N 3/045; G06N 3/0464;
(Continued)

(56) References Cited

U.S. PATENT DOCUMENTS

2020/0293863 A1 9/2020 Gatot et al.
2021/0125053 A1* 4/2021 Faibish .................. G06N 3/082

OTHER PUBLICATIONS

Eman Hassan, Yasmin Halawani, Baker Mohammad and Hani Saleh "Hyper-Dimensional Computing Challenges and Opportunities for AI Applications"; IEEE Access; Digital Object Identifier 10.1109/ ACCESS.2021.3059762 (Year: 2021).*
(Continued)

*Primary Examiner* — Charlotte M Baker
(74) *Attorney, Agent, or Firm* — MOSER TABOADA

(57) ABSTRACT

Method and apparatus for processing data using a reconfigurable, hyperdimensional neural network architecture comprising a feature extractor and a classifier. The feature extractor comprises a neural network for encoding input information into hyperdimensional (HD) vectors and extracting at least one particular HD vector representing at least one feature within the input information, wherein the neural network comprises no more than one multiply and accumulate operator. The classifier is coupled to the feature extractor for classifying the at least one particular HD vector to produce an indicium of classification for the at least one particular HD vector and wherein the classifier does not comprise any multiply and accumulate operators.

30 Claims, 9 Drawing Sheets

(58) Field of Classification Search
　　　CPC ...... G06N 3/048; G06N 3/0495; G06N 3/063;
　　　　　　　G06N 3/082; G06N 3/0895; G06N 3/09;
　　　　　　　　G06N 3/096; G06N 3/098; G06F
　　　　　　　　　　2207/4824; G06F 7/544
　　　USPC ......................................................... 382/157
　　　See application file for complete search history.

(56) References Cited

OTHER PUBLICATIONS

Justin Morris, Kazim Ergun, Behnam Khaleghi, Mohsen Imani, Baris Aksanli, and Tajana Rosing "HyDREA: Towards More Robust and Efficient Machine Learning Systems with Hyperdimensional Computing"; DOI: 10.23919/DATE51398.2021.9474218Conference Paper Feb. 2021 (Year: 2021).*

Keshab K. Parhi, Nanda K. Unnikrishnan "Brain-Inspired Computing: Models and Architectures"; DOI: 10.1109/OJCAS.2020.3032092; Oct. 23, 2020 (Year: 2020).*

Salamat, et al., "Accelerating hyperdimensional computing on FPGAs by exploiting computational reuse", Department of Computer Science and Engineering, University of California San Diego, La Jolla, California.

Karunaratne, et al., "In-memory hyperdimensional computing", IBM Research—Zurich, Switzerland; Department of Information Technology and Electrical Engineering, Zurich, Switzerland.

Hazarika, et al., "Shift and Accumulate Convolution Processing Unit", TENCON 2019—2019 IEEE Region 10 Conference (TENCON).

Karunaratne, "Fulfilling Brain-inspired Hyperdimensional Computing with In-memory Computing", https://www.ibm.com/blogs/research/2020/06/in-memory-hyperdimensional-computing.

International Search Report & Written Opinion for Application No. PCT/US22/21718 mailed Jul. 26, 2022.

* cited by examiner

LSTM
CELL

DATA    WEIGHT    500

SHIFT REGISTER ~502

ACCUMULATOR ~504

OUTPUT

HD
VECTOR
CURRENT    TRAINED    TRAINED
IMAGE    HD    CLASS
VECTOR    INDEX

XOR ~602

600

ACCUMULATOR ~604

HAMMING
DISTANCE

COMPARATOR ~604

BEST MATCH
CLASS INDEX

RECONFIGURABLE, HYPERDIMENSIONAL NEURAL NETWORK ARCHITECTURE

GOVERNMENT RIGHTS

This invention was made with Government support under agreement no. HR00112090037, awarded by DARPA. The Government has certain rights in the invention.

FIELD

Embodiments of the present principles generally relate to neural networks and, more particularly, to a reconfigurable, hyperdimensional neural network architecture.

BACKGROUND

Neural network (NN) architectures are important for solving tasks with human-like precision: however, traditional deep NN (DNN) architectures are extremely power intensive and unsuitable for incorporation into low-power devices (e.g., battery operated devices). Currently, DNNs can perform recognition and classification tasks with very high accuracy, but require long training times, consume a substantial amount of power, have a large memory footprint and are not reconfigurable in the field.

Thus, there is a need for a neural network architecture that is field reconfigurable as well as memory and energy efficient.

SUMMARY

Embodiments of the present invention generally relate to a reconfigurable, hyperdimensional neural network architecture as shown in and/or described in connection with at least one of the figures.

More specifically, embodiments of the invention include a method, apparatus and computer readable media configured to process data using machine learning comprising: a feature extractor comprising a neural network configured to encode input information into hyperdimensional (HD) vectors and extract at least one particular HD vector representing at least one feature within the input information, wherein the neural network comprises no more than one multiply and accumulate operator at each layer of the first neural network: and a classifier, coupled to the feature extractor, configured to classify the at least one particular HD vector to produce an indicium of classification for the particular HD vector and wherein the classifier does not comprise any multiply and accumulate operators.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
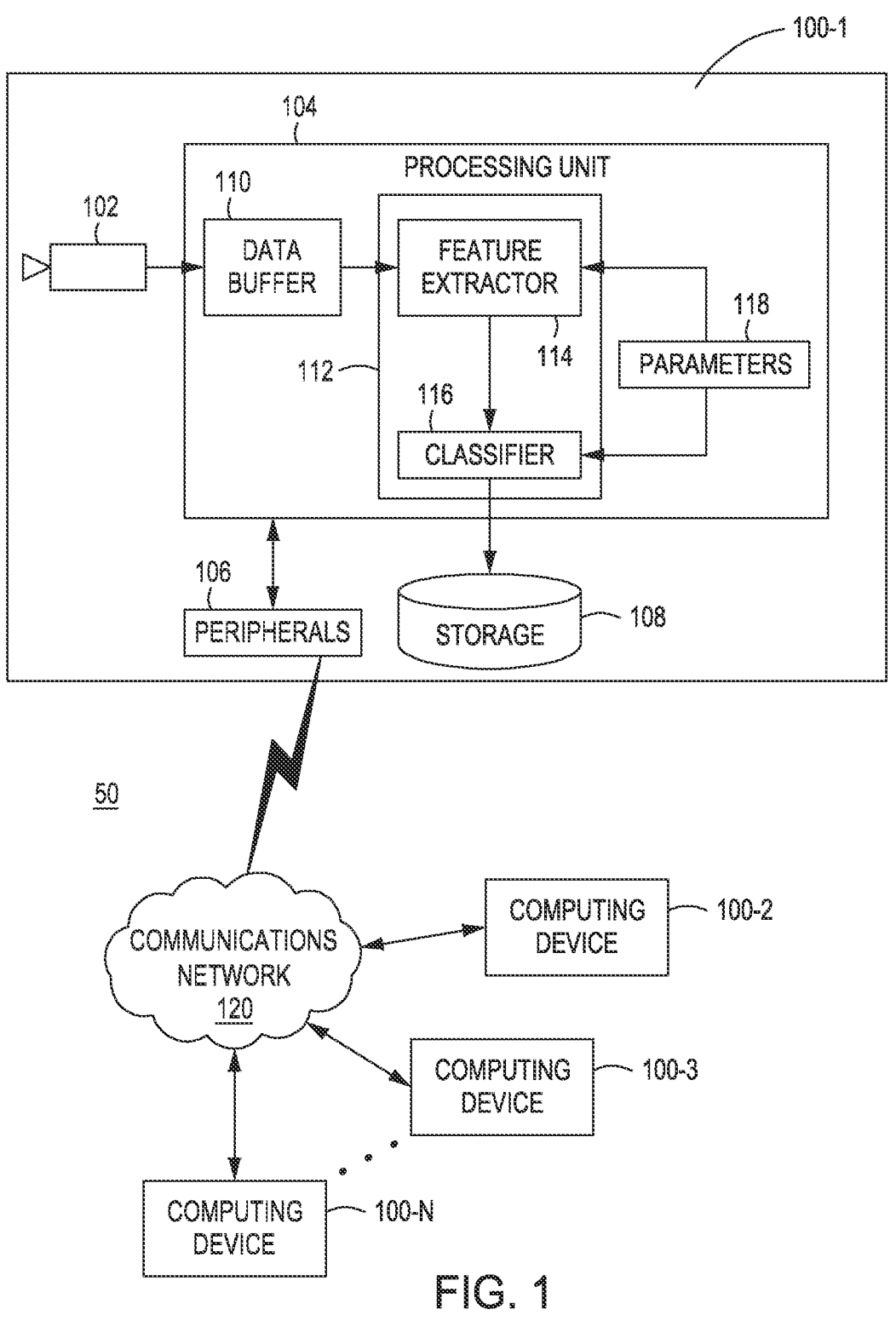
FIG. 1 depicts a block diagram of an exemplary computing device utilizing a hyperdimensional, reconfigurable neural network architecture of at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for creating and operating a computing device having a reconfigurable, hyperdimensional neural network architecture. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments of a computing device comprising a reconfigurable, hyperdimensional neural network architecture described herein enable many capabilities and applications not previously achievable thru any individual computing system. Embodiments of the disclosed architecture address the problem of decreasing size, weight, and power (SWaP) for computing devices as well as enable computing devices to locally perform artificial intelligence (AI) processing. Embodiments of the invention are especially useful in edge devices, i.e., computing devices that operate at the edge of communications networks such as mobile phones, laptop computers, Internet of Things (IOT) devices, and the like. Using embodiments of the invention enables edge devices to no longer rely upon centralized AI processing. In addition, embodiments of the invention facilitate federated learning amongst edge devices and are reconfigurable in the field using gradient-free retraining.

An example system application for embodiments of energy and memory efficient, field reconfigurable neural networks is the operation and communication of distributed smart sensors within a smart city. Cities are adding autonomous monitoring capabilities to support safety, health and the smooth flow of traffic and crowds. Cities have begun to add AI-based edge-based sensing and processing throughout to monitor vehicle traffic flow, air pollution, water levels, crowd monitoring, etc. Today edge-based sensing solutions require the cloud to retrain and reconfigure edge computing solutions within city network requiring the need for high data bandwidth, long communication times, long training times, large processor devices and high-power consumption.

To support the goals of smart cities to autonomously monitor operations throughout including sensing from mobile platforms such as UAV aerial monitoring, cars, rechargeable portable bikes or scooters, etc., platform sensing and processing must be small and low-power. For the timely autonomous monitoring of dynamically changing activities, events, objects, viewed by multiple sensors in a city it is required to retrain and reconfigure the neural network at the edge. Using reconfigurable hyperdimensional Neural Networks at the edge enables the ability to add new events to monitor across a wide range of sensors. For example, the city may desire to change the air quality level it is monitoring from its air sensors, or the police may be looking for a vehicle involved in a recent robbery on the traffic cameras. Extending an edge-based neural network in a city to look for a new activity or object is as easy as sharing a hyperdimensional vector representing the activity or object to other edge-sensor(s) which then reconfigure their local neural network without requiring resources form the cloud for retraining. Embodiments of the invention that are applicable to smart cities may be scaled to smaller environments such as smart homes.

Another one of the many use case applications for reconfigurable hyperdimensional neural networks is surveillance of objects of interest from numerous vantage points (UAV's, people on the ground or building, satellite, etc.). For this application it is critical reconfiguration of Neural Networks at the edge is performed to support dynamically reconfiguring the Neural Network to support views from different viewpoints and a different sensing environments.

More specifically, embodiments of the reconfigurable, hyperdimensional neural network architecture comprise a feature extractor and a classifier. The feature extractor and classifier are implemented using non-MAC operations (i.e., the neural networks utilize no more than one multiply and accumulate (MAC) operation per layer of the neural network). The non-MAC operations are implemented using exclusive OR (XOR) and shift accumulate (SACC) operations. A neural network using non-MAC operations has a smaller memory footprint, has improved efficiency, requires less digital logic operations and has less latency than a conventional fully MAC-based neural network. In addition, the use of hyperdimensional vectors to represent data and facilitate data processing, improves security of a device using the architecture and enhances noise resiliency of such devices.

The feature extractor comprises a first neural network having a plurality of layers, where each layer's function is defined by weights. The first neural network performs non-MAC operations using SACC operations to convolve a data value with a weight to produce HD vector representation of the input data. An HD vector is a vector having a large number of bits. In one embodiment of the invention, the HD vectors have 4096 bits. Of course, any number of bits may be used as long as the number is large enough to facilitate hyperdimensional computing and the benefits that arise from such HD computing, e.g., noise resiliency, security and the like, and uses XOR operations to process the HD vectors to extract specific features of the input data. The SACC operation comprises a shift register and an accumulator, where operation of the shift register is a function of the applied weight value. In an exemplary embodiment, a Generalized Ternary Connect (GTC) algorithm is used such that the weights are constrained to integer powers of two allowing for floating point multiplication to be accomplished by the weights with bit shifts. In an exemplary application, the first neural network is trained to extract specific image features from video image data. Each feature is encoded as a hyperdimensional vector.

The classifier comprises a second neural network implemented using non-MAC operations. The second neural network is implemented using an HD computing architecture that includes XOR (exclusive OR) and digital shift operations to facilitate classifying the extracted features.

In operation, the first neural network is trained separate from the second neural network to generate HD vectors representing features in the input data and extract the desired features. Once the first neural network training is complete, the parameters (e.g., weights) of the network are fixed. The first neural network is connected to the second neural network and the second neural network is trained to classify the extracted features produced by the first neural network. The training data enables the second neural network to create exemplars (i.e., an arrangement of weights) that enable the network to classify extracted features into specific classes. The second neural network is capable of being reconfigured to alter its classifications processing to alter or add classes. Such retraining may be performed in the field. Additionally, the reconfigurable, hyperdimensional neural network architecture is capable of processing labeled or unlabeled data.

The hyperdimensional, reconfigurable architecture may be implemented as a software application executed by a computing device or as a hardware device such as a field programmable gate array (FPGA) or application specific integrated circuit (ASIC).

The aforementioned embodiments and features are now described below in detail with respect to the Figures.

FIG. 1 depicts a block diagram of a network 50 comprising a plurality of computing devices 100-1, 100-2, 100-3, . . . 100-N, where N is an integer, coupled to one another through a communications network 120 of at least one embodiment of the invention. FIG. 1 depicts details of an exemplary computing device 100-1 utilizing a reconfigurable, hyperdimensional neural network architecture 112 of at least one embodiment of the invention. In one embodiment, the computing device 100 may be an edge device, e.g., a computing device designed to operate on the edge of a communications network (i.e., Internet). The computing device 100-1 comprises a sensor 102 for collecting information regarding an environment surrounding the computing device 100-1. In at least one embodiment, the sensor 102 produces temporal data (i.e., time-variant data) such as video, audio, temperature, radiation, seismic, motion, wireless signals, etc. In a further embodiment, input information may be spatial data. In one embodiment, the sensor 102 is a video camera that generates a sequence of images (video frames). In other embodiments, the sensor 102 may be one or more of, but not limited to, microphone(s), radiation sensor(s), motion sensor(s), thermometers, chemical sensors, and the like.

The computing device 100-1 may be any form of computing device capable of processing data using a reconfigurable, hyperdimensional neural network architecture 112 as described herein. Examples of such computing devices or platforms containing a computing device include, but are not limited to, mobile phones, tablets, laptop computers, personal computers, digital assistants, unmanned aerial vehicles, tactical communication devices, autonomous vehicles, autonomous robots, and the like.

The computing device 100-1 comprises at least one processing unit 104, peripherals 106 and digital storage 108 (i.e., non-transitory computer readable media). The digital storage 108 may be any form of memory device or devices such as, but not limited to, a disk drive, solid state memory, etc. The peripherals 106 may comprise one or more of, but not limit to, removable memory, displays, inertial measurement unit, GNSS (Global Navigation Satellite System) receiver, interfaces to networks 120 such as the Internet or other form of cloud computing network, debugging interfaces, and the like. Data as well as its classification may be exported from the device 100 to a network 120 for additional processing or analysis. The network 120 may also provide a connective path to other computing devices 100-2, 100-3, . . . 100=N to facilitate federated learning to reconfigure the architecture 112 or the architecture of other edge devices that are connected to the network 120.

The processing unit 104 comprises an implementation of the reconfigurable, hyperdimensional neural network architecture 112. The processing unit 104, as described in detail below, may be implemented as software code (an application) executing on a computer, as an FPGA or as an ASIC. The processing unit 104 comprises a data buffer 110, the architecture 112, and parameters 118. The parameters 118 may be stored within processing unit memory, externally in peripheral memory, or a combination of external and internal memory. The parameters 118 comprise weights and other control information used by the architecture 112. The architecture 112 comprises a feature extractor 114 and a classifier 116, which are implemented using non-MAC operations. Structure and operation of the architecture 112 are described in detail below.

Figure 2:
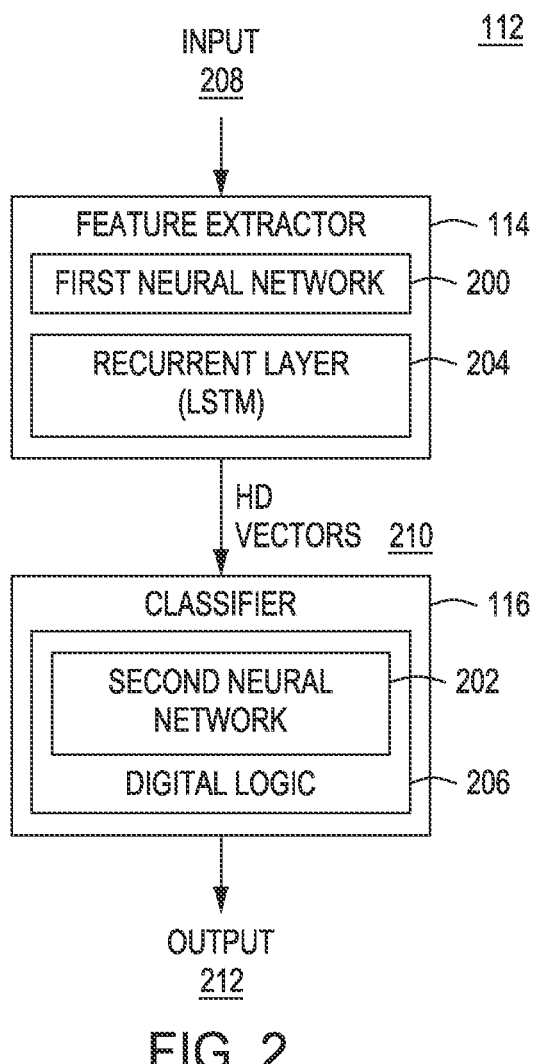
FIG. 2 depicts a block diagram of the reconfigurable, hyperdimensional neural network architecture in accordance with at least one embodiment of the invention.

FIG. 2 depicts a block diagram of the reconfigurable, hyperdimensional neural network architecture 112 in accordance with at least one embodiment of the invention. The architecture 112 comprises a feature extractor 114 and a classifier 116. In one embodiment, the input 208 comprises temporal data (e.g., video) such that an image frame of pixel data is processed by the feature extractor to output HD vectors 210, where the HD vectors 210 represent image features within the image frame, i.e., a person, a vehicle, a sign, etc. The HD vectors 210 are applied to the classifier 116 where, in one embodiment, the classifier identifies particular classes for the extracted features, e.g., if the HD vector 210 represents a person, the classifier may classify the person as performing a specific activity such as playing tennis.

To perform feature extraction, the feature extractor 114 comprises a first neural network 200 having a plurality of artificial neurons that are taught to encode input data into HD vectors 210 representing at least one feature of interest that resides in the data. The structure of the neural network 200 is described below with respect to FIGS. 3, 4, 5 and 6 and training of the first neural network 200 is described below with respect to FIG. 7. In some embodiments, the feature extractor 114 may utilize a recurrent layer 204 that provides long short-term memory (LSTM) functionality to the first neural network 200. The use of the recurrent layer 204 is optional. Using a recurrent layer is useful when processing temporal data such as video or time sequenced sensor data. The LSTM layer 204 may be an artificial neuron layer in the first neural network or be considered a separate single layer network. Using LSTM neurons enhances a neural network's ability to accurately process temporal data. In one exemplary embodiment, the output HD vectors 210 comprise 4096 binary bits derived from an RGB image having a size of 224×224 pixels with 64 bits per pixel. All processing within the feature extractor 114 is performed using non-MAC operations, e.g., SACC operations. In one embodiment, the feature extractor 114 may utilize on integer multiplier at the output of each layer of the first neural network. The use of an integer multiplier may arise in embodiments where batch or other normalization techniques are used.

To preform classification, the classifier 116 comprises digital logic 206 that may include or be configured as a second neural network 202 that is used to classify the features that are supplied by the feature extractor 114. The structure of the second neural network 202 is described below with respect to FIGS. 3, 5 and 6 and training of the second neural network 202 is described below with respect to FIG. 7. In some embodiments, the classifier 116 comprises non-MAC digital logic 206 that is used to process the classification estimates and determine the most accurate classification (output 212) for the input feature (input 208). Function and structure of the logic 206 are described with respect to FIG. 6. In one embodiment, the output of the classifier 116 comprises indicium of classification (e.g., a classification index, a class identifier, a class name, and the like) for the extracted HD vector or vectors.

By using non-MAC operations within the architecture 112, the architecture is energy efficient, memory footprint efficient and fast. Simulations indicate an architecture using non-MAC operations when implemented in an FPGA has about ten times less memory footprint, about ten times simpler operations and uses about one hundred times lower power than a fully MAC-based architecture. The weights used in the neural networks are constrained to be power of two and the activations are constrained to be integers. Applying these constraints eliminates the need for floating point MAC operations and converts the MAC operations in SACC operations. In addition, in an exemplary embodiment, the training algorithm for the non-MAC networks is a Generalized Ternary Connect (GTC) algorithm.

Figure 3:
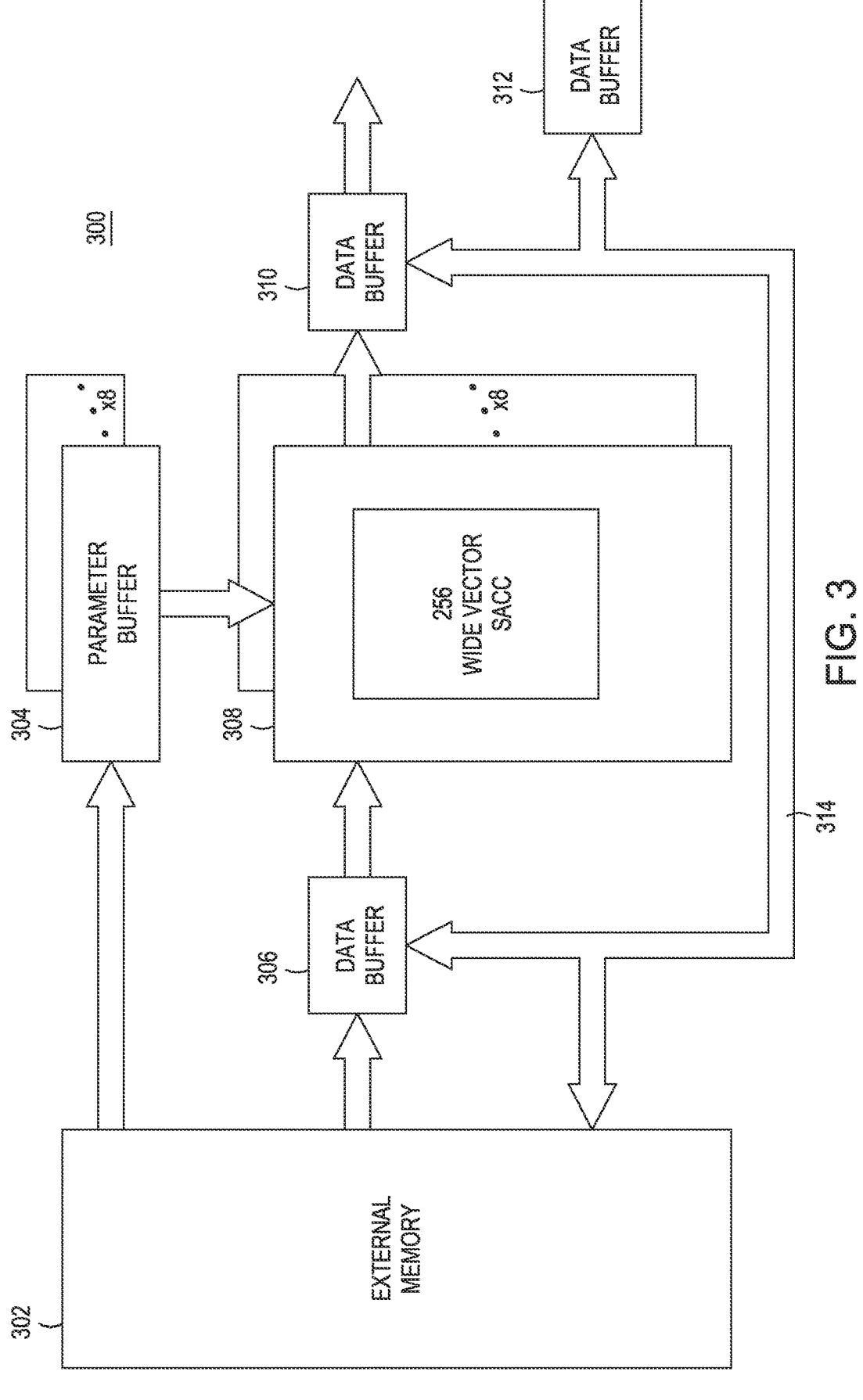
FIG. 3 depicts a schematic diagram of a neural network in accordance with at least one embodiment of the present invention.

FIG. 3 depicts a schematic diagram of a neural network 300, i.e., either first or second neural networks 200 or 202 in accordance with at least one embodiment of the present invention. The network 300 comprises a first data buffer 306, a second data buffer 310, a third data buffer 312, a parameter buffer 304 and an M×N wide vector SACC neural network 308, where, in one embodiment, M is 8 and N is 256. The network 300 is coupled to an external memory 302 which supplies input data to the network 300. The SACC operations are described in detail with respect to FIG. 5 and network training is described with respect to FIG. 7. The network 300 may be implemented as SACC operations in software or in hardware as physical shift and accumulate functions using shift registers and adders. In one embodiment, the neural network 308 may comprise a ResNet50) module configured to use power of 2 weights and form N parallel SACC operation units to perform M×N vector operations. To facilitate fast operation, in one embodiment, the ResNet50) module may have three data buffers 306, 310, and 312 that are implemented as a processor in memory (PIM) architecture in an ASIC. As such, the buffers 306, 308, 312 are integrated with the processing functions such that buffer data can be quickly swapped amongst buffers along path 314 to enable each layer of the network to be implemented by a single set of SACC operation units. In some embodiments, the buffers may be implemented as a single buffer with parallel read and write functions. The use of three buffers are intended to reduce data movement. In an ASIC implementation, an external memory may be implemented as Flash memory to store embedded microcode and kernel weights. The data buffers may be implemented with size and power efficient technology such as MRAM, effectively implementing a "compute in memory" ASIC. Each layer of network processing requires a swap of data amongst the data buffers and reconfiguration of the SACC operation units to form the next neural network layer. A ResNet50 module also includes output functions that enable the module to be configured to perform batch normalization functions, scaling operations, RELU operations, as well as non-linear functions such as tanh and sigmoid. In an FPGA implementation. As described in more detail below, the network architecture may be separately configured for ResNet50 and a parallel operating LSTM function. In an ASIC implementation, the network architecture may be a software configurable module for use in a wide range of applications.

In other embodiments, the first and second neural networks 200/202 may be implemented using other well-known convolutional neural network (CNN) such as VGG16 network where the weights are constrained to power of two values. In one exemplary embodiment of network 300, the neural network 308 may be configured as LSTM-based neurons. The structure and operation of an LSTM-based neuron is described with respect to FIG. 4.

Figure 4:
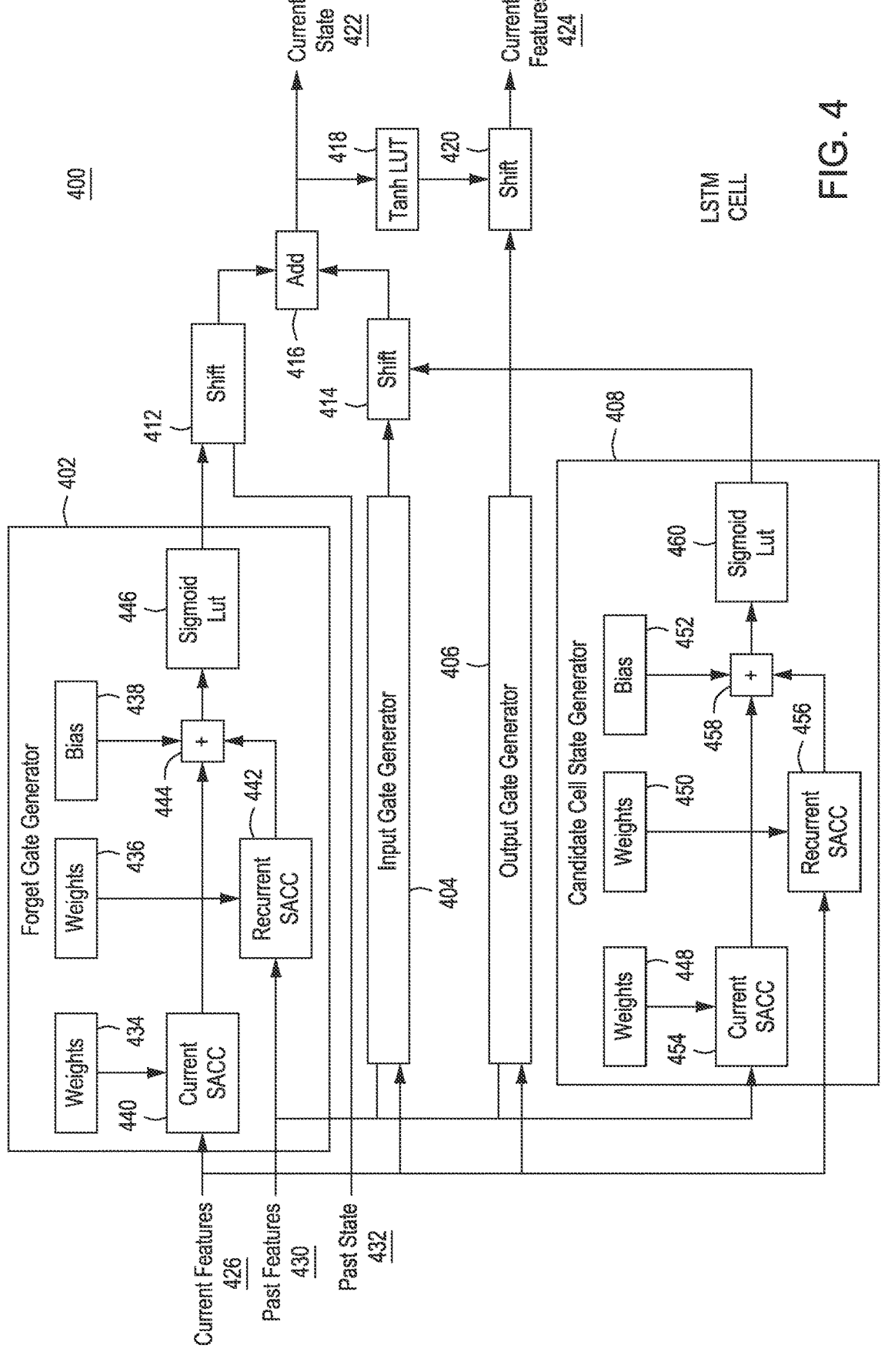
FIG. 4 depicts a block diagram of a non-MAC LSTM-based neuron (a cell) in accordance with at least one embodiment of the invention.

FIG. 4 depicts a block diagram of a non-MAC LSTM-based neuron (a cell) 400 in accordance with at least one embodiment of the invention. Each functional block of the cell 400 may be implemented using software code executed on a computing device. The computer instructions cause a processor to perform the function of each block. Such a computing device is described with respect to FIG. 9 below. Alternatively, in an FPGA or ASIC implementation, the functions of the cell 400 may be implemented via hardware elements (shift registers, adders and look up tables (LUTs)) and/or a combinations of hardware elements and software processes executing on processors within the ASIC or FPGA.

The LSTM cell 400 has three gate generators (forget gate generator 402, input gate generator 404 and output gate generator 406) and a candidate cell state generator 408. These generators 402, 404, 406 and 408 perform matrix multiplications using weights that are a power of two to facilitate performing the multiplication function using a shift register, e.g., a SACC operation. The non-linear functions of sigmoid and tanh (at 446, 460, 418) are implemented using either a look up table (LUT) as depicted or a piecewise-linear function. An LSTM cell processes the features from the first neural network to identify features that are important and should be remembered and those that are unimportant and can be forgotten. In short, the LSTM layer provides selective memory to the first neural network.

The inputs to the LSTM cell 400 include the current feature 426, the past feature 428 and the past state of the LSTM cell 432. The three gate generators 402, 404, 406 are identical in structure—they each comprise current weights source 434, recurrent weights source 436, bias source 438, a current SACC 440, a recurrent SACC 442, an adder 444 and a sigmoid function 446. The weights sources 434, 436, and 438 are implemented by local memory. In embodiments of a hardware implementation, the memory may be located near or combined with the processor performing the neural network functions (e.g., process in memory devices). The current feature 426 are shifted and accumulated in current SACC 440. The shifting is controlled by the power of two weights from source 434. Similarly, the past feature 428 are shifted and accumulated in recurrent SACC 442 in a manner that is controlled by power of two weights from source 436. The outputs of the current and recurrent SACC operations 440 and 442 are added within adder 444. A bias is also applied to the added value from bias source 438. The sum from the adder 444 is applied to the sigmoid look up table 446 to apply a non-linear function having a value ranging from 0 to 1.

The candidate cell generator 408 has a similar arrangement of components as the gate generators 402, 404, 406 except the cell generator 408 has a tanh non-linear function. Specifically, the candidate cell generator comprises a current weight source 448, a recurrent weight source 450, a bias source 452, a current SACC 454 a recurrent SACC 456, and adder 458 and a tanh LUT 460. The tanh non-linearity ranges from −1 to 1.

In operation, the forget gate generator 402 determines which relevant information from the prior steps is needed. The input gate generator 404 decides what relevant information can be added from the current step, and the output gate generator 406 finalizes the next state. The candidate cell state generator 408 generates a cell state value. The outputs of the generators are combined using element-wise shift registers 412, 414 and 420 to combine the outputs of the generators 402, 404, 406 and 408. Specifically, the output of the forget gate generator 402 and the past state 432 are applied to shift register 412, the output of the candidate cell state generator 408 and the output of the input gate generator 404 are applied to shift register 414. The output of each of the shift registers 412 and 414 are added in adder 416 and form the current state output 422. The current state 422 is applied to a tanh function LUT 418 and the output is coupled to a shift register 420. The output of the output gate generator 406 is also applied to the shift register 420 and the output of the shift register forms the current feature output 424.

Figures 5, 6:
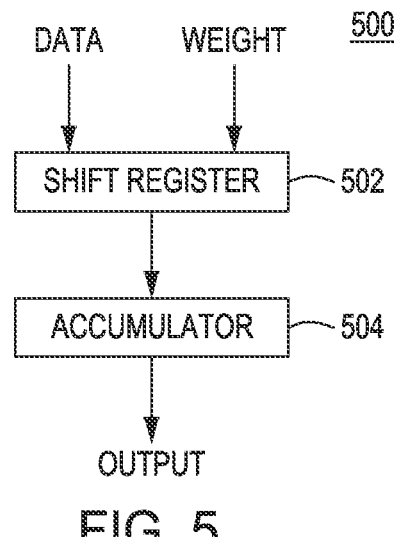
FIG. 5 depicts a block diagram of SACC operation unit used to provide non-MAC functionality to the reconfigurable, hyperdimensional neural network architecture in accordance with at least one embodiment of the invention.
FIG. 6 depicts a block diagram of digital logic used to provide non-MAC functionality to the reconfigurable, hyperdimensional neural network architecture in accordance with at least one embodiment of the invention.

FIG. 5 depicts a block diagram of SACC operation unit 500 used to provide non-MAC functionality to the reconfigurable, hyperdimensional neural network architecture in accordance with at least one embodiment of the invention. The SACC operation unit 500 comprises a shift register 502 and an accumulator 504. The inputs to the shift register 502 are the data (e.g., intermediate data within the neural network or input data such as video pixels) and a weight value that is constrained to have a value that is a power of two. The output is a multiplication between the weight and the data without using a MAC operation. Each functional block of the unit 500 may be implemented using software code executed on a computing device. The computer instructions cause a processor to perform the function of each block. Such a computing device is described with respect to FIG. 9 below. Alternatively, in an FPGA or ASIC implementation, the functions of the unit 500 may be implemented via hardware elements (shift registers, adders) and/or a combinations of hardware elements and software processes executing on processors within the ASIC or FPGA.

FIG. 6 depicts a block diagram of digital logic 600 used to provide non-MAC functionality to the reconfigurable, hyperdimensional neural network architecture in accordance with at least one embodiment of the invention. The digital logic 600 comprises an exclusive OR (XOR) 602, an accumulator 604 and a comparator 606. The input to the XOR 602 is the HD vector representing a feature of the current image and a trained HD vector representing a class (i.e., class exemplars). The bit-wise XOR function outputs the difference between the feature vector and the exemplar. In operation, each feature vector is XORed with a plurality of exemplars to determine which exemplar class vector matches closest to the feature vector. In one embodiment, the trained HD vectors may be recalled from an LUT. The accumulator stores the differences between the vectors. The output of the accumulator is the hamming distance between the two input vectors. The comparator 606 is controlled to step through all the trained classes indexes such that the comparator compares all the hamming distances of the feature vector compared to all the exemplars. The comparator outputs the class index associated with the smallest hamming distance (i.e., the class with the best match to the feature). By using an XOR, an accumulator and a comparator to implement the digital logic, no MAC operations are used.

Figure 7:
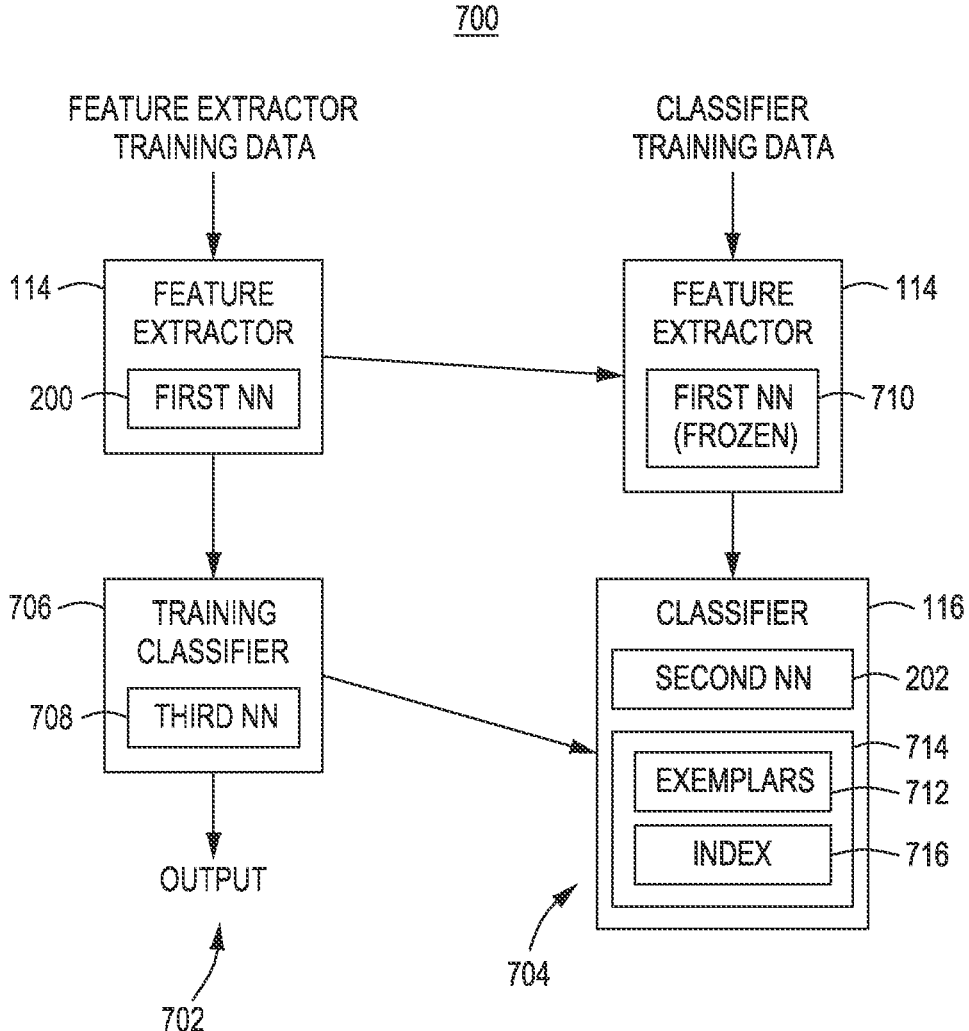
FIG. 7 depicts schematic block diagram of the process for training the first and second neural networks of the reconfigurable, hyperdimensional architecture in accordance with at least one embodiment of the invention.

FIG. 7 depicts schematic block diagram of the process 700 for training the first and second neural networks of the reconfigurable, hyperdimensional architecture (112 of FIG. 1) in accordance with at least one embodiment of the invention. A first operation 702 of the training process 700 trains the first neural network 200 of the feature extractor 114. The feature extractor 114 is trained separately from the classifier 116. Initially, the feature extractor 114 is coupled to a training classifier 706 that may be MAC-based or non-MAC-based. The training classifier utilizes a third neural network 708 (a training neural network) that is designed to assist in training of the first neural network 708. The objective of the third neural network 708 is to ensure the feature extractor is quickly and accurately identifying features of interest in the data. In one embodiment where the feature extractor 114 is being trained to identify features in video image sequences, the training data is, for example, the UCF-101 Activity Classification data set. In practice, the first and third neural networks are trained as a single neural network using, for example, conventional gradient descent training. Once trained, the weights and biases of the first neural network 200 are fixed, i.e., frozen, and the first neural network is removed from the training classifier 706 to be used with the classifier 116.

At 704, the feature extractor 114 with its frozen first neural network 710 forms a fixed backbone of the architecture 112 of FIGS. 1 and 2. The classifier 116 is coupled to the output of the feature extractor 114 and the second neural network 202 is trained. In one embodiment, training of the second neural network 202 is performed using feedforward, bit-wise logical operations—traditional backpropagation is not used. In other embodiments, other forms of self-supervised learning may be used such as, but not limited to, gradient descent training, gradient-free training, and the like. In an embodiment for processing video images, the training data may be, for example, the UCF-101 Activity Classification data set. During training, the feature extractor 114 uses the frozen first neural network 710 to extract features from the training data while the second neural network 202 is trained to classify the extracted features and generate a plurality of exemplars 704. The exemplars 712 are stored in a LUT 714 and each exemplar 712 is assigned a unique index 716. The index 716 is used to sequentially identify and recall each exemplar 712 representing a class for comparison to an extracted feature HD vector. For example, using the UCF-101 data set, the feature extractor 114 extracts features, such as a person performing an activity, and the classifier 116 is trained to identify the activity using an exemplar HD vector representing activities such as running, walking, playing tennis, etc. Post training, new data may be applied to the architecture such that features in the new data are classified.

In addition, the classifier 116 may be retrained (i.e., reconfigured) to add additional classifications while operating in the field. Such training is performed using gradient-free training. In one embodiment, reconfiguration is performed by a user identifying an image feature (new feature) and assigning a class label (new classification) to the feature. The new feature is then applied to the second neural network 202 and, in a single pass, an exemplar 712 and its index 716 is created and stored in the LUT 714 for future use in classifying data. The additional classification information and/or feature identification may originate with other edge devices such that federated learning is used to enable edge devices to share features and/or exemplars to learn from each other, e.g., sharing new features and/or new classifications. In this manner, the classifier 116 may be reconfigured without training the second neural network 202.

Although the architecture is described as using a classifier (implying the use of labeled data), the second neural network may be trained or retrained to perform other objectives or additional objectives. As such, for example, the architecture may be trained to group unlabeled data with respect to similarities in the data.

Figure 8:
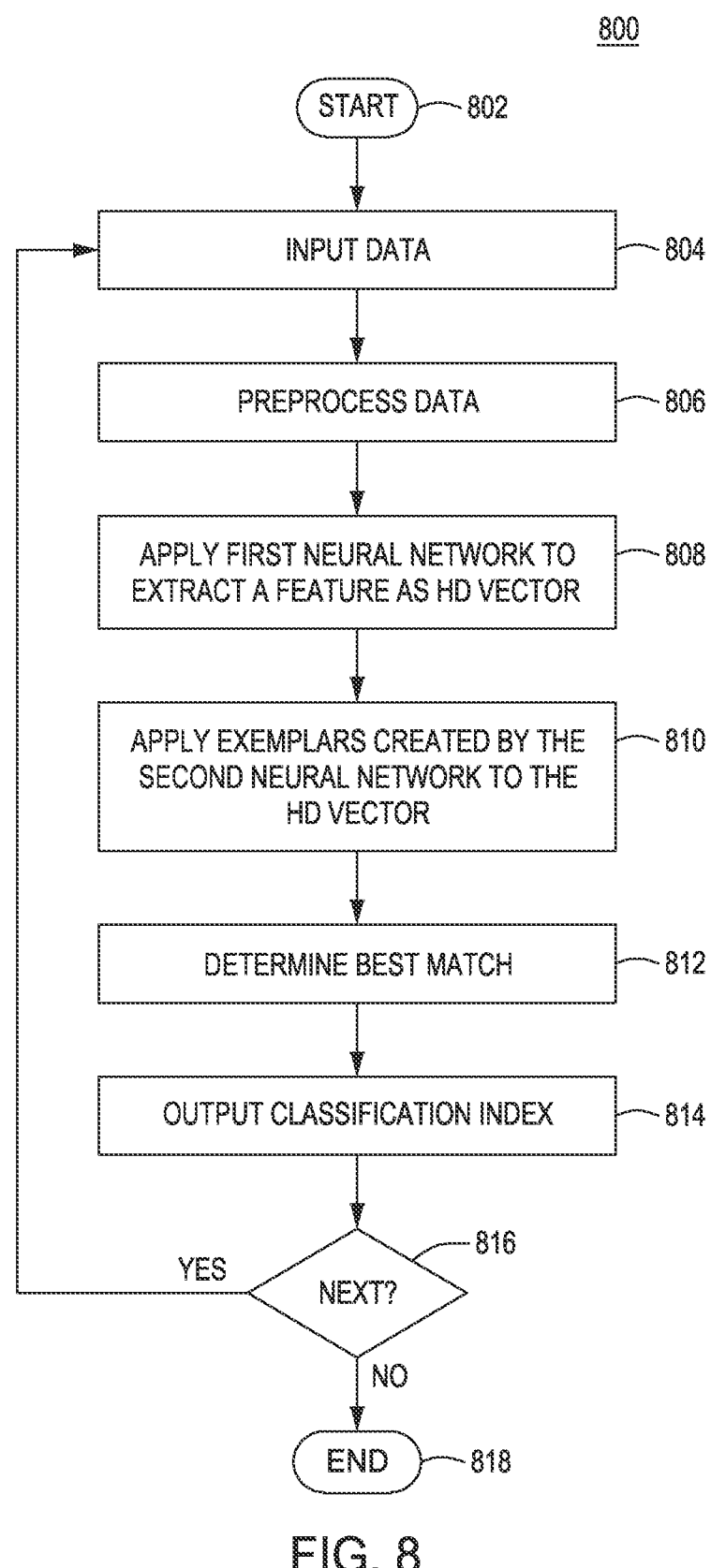
FIG. 8 depicts a flow diagram of the operation of the reconfigurable, hyperdimensional neural network architecture in accordance with at least one embodiment of the invention

FIG. 8 depicts a flow diagram of a method 800 of operation of the reconfigurable, hyperdimensional neural network architecture in accordance with at least one embodiment of the invention. The method 800 may be implemented as a software application executed on a computing device (described with respect to FIG. 10) or implemented in hardware using an FPGA or ASIC (described with respect to FIG. 9).

The method 800 begins at 802 and proceeds to 804 where data is input to the architecture. In one embodiment, the data may be video comprising image frames of pixels. At 806, the method 800 may preprocess the data, as needed. Preprocessing is option, depending on the data being analyzed by the architecture. For example, video may require the image frames to be scaled, filtered, subsampled, resized, etc.

At 808, the first neural network (previously trained and frozen as described with respect to FIG. 7) is applied to the input data to extract a feature as an HD vector. The HD vector is a long string of digital bits (0,1) that represents the content of a segment of data (e.g., an image frame). In the video example, the HD vector may, for example, represent a person performing an activity as captured in an image frame. In such an embodiment, the image frames are processed in sequential order such that each image from is represented as an HD vector.

At 810, the HD vectors are compared to a plurality of the exemplars that were created during training of the second neural network. The exemplars may be stored in a LUT and indexed for rapid recall during the comparison process. Each comparison of an HD vector with an exemplar (also an HD vector representing a particular class) results in a hamming distance representing the difference between the exemplar and the HD vector. Comparison proceeds against a plurality of exemplars. In the video example, the HD vector may represent a person performing an activity and the exemplars may represent various classes of activities (e.g., running, walking, dancing, playing tennis, etc.). The comparison finds the best match between the extracted feature and the plurality of exemplars.

At 812, the best match is determined as the exemplar having the smallest hamming distance. One exemplary embodiment for performing 808, 810 and 812 as a non-MAC function is described with respect to FIGS. 4, 5, and 6 above. At 814, the classification index for the exemplar with the best match forms an output of the architecture, i.e., an indicium of classification is output.

At 816, the method 800 queries whether the method 800 should process a next group of data (e.g., a next video frame). If the query is affirmatively answered, the method 800 proceeds to 804: otherwise, the method 800 proceeds to 818 and ends.

Figure 9:
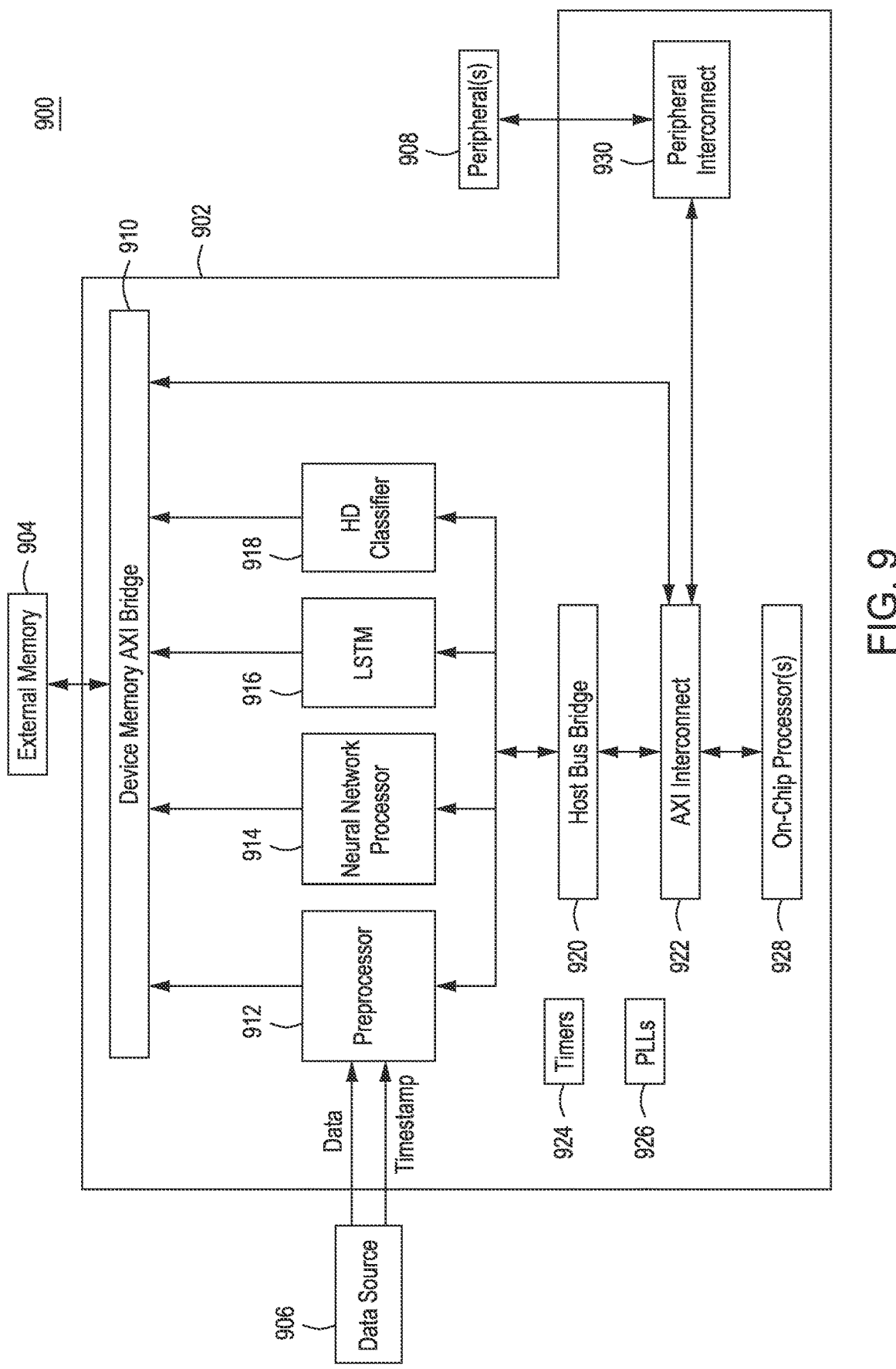
FIG. 9 depicts a block diagram of a hardware implementation of a computing device (e.g., an edge device) using the reconfigurable, hyperdimensional neural network architecture in accordance with at least one embodiment of the invention.

FIG. 9 depicts a block diagram of a hardware implementation of a computing device 900 (e.g., an edge device) using the reconfigurable, hyperdimensional neural network architecture in accordance with at least one embodiment of the invention. The hardware implementation may be a field programmable gate array (FPGA) or an application specific integrated circuit (ASIC). The FPGA/ASIC is identified as block 902. The device 902 comprises external memory 904, a data source 906 (e.g., video camera, sensor, etc.) and peripherals 908 (e.g., display, inertial measurement unit, GNSS navigation unit, USB connection, PCIe connection, JTAG/Debug serial interface, memory card connection, etc.). In an exemplary embodiment, the hardware implementation block 902 comprises a device memory AXI bridge 910, a data preprocessor 912, neural network processor 914, LSTM 916, HD classifier 918, host bus bridge 920, AXI interconnect 922, on-chip processor(s) 928, timers 924, phase lock loop(s) (PLLs) 926, and a peripheral interface 930. The data preprocessor 912 reformats the data from the data source 906, as necessary. For video data, the preprocessor 912 may subsample the images, reformat the dimensions of the images, reorient the images, and the like. The preprocessed data may be coupled through the AXI bridge 910 to the external memory 904 or to other architecture processes (e.g., the neural network processor 914). The neural network processor 914 may include integrated memory or have memory located nearby the processor such that the neural network processes may be accomplish very quickly. The AXI bridge 910 interconnects the preprocessor 912, the neural network processor 914, the LSTM 916, and the HD classifier 918 to facilitate data flow between processes and the external memory 904. The neural network processor 914, LSTM 916 and HD classifier 918 form the architecture (112 in FIG. 1) that operates as described above.

The preprocessor 912, neural network processor 914, LSTM 916, and HD classifier 918 are coupled to the host bus bridge 920 through which data and instructions are passed to the AXI interconnect 922, on-chip processor(s) 928 and the peripheral interface 930. The timers 924 and PPLs 926 support functionality of the architecture. In one ASIC embodiment, processors may use process in memory (PIM)

architectures to position the memory as near to the processing function as possible to enhance speed and reduce power consumption.

In a first hardware implementation, an FPGA may be programmed to perform the non-MAC processes and functions described with respect to FIGS. 1-8. For example, a ResNet50) module may be operated on an FPGA to facilitate implementation of the non-MAC neural network architecture described herein. By porting an FPGA design to an ASIC to form a second hardware implementation, an additional power savings of 10 to 100 times may be realized.

Figure 10:
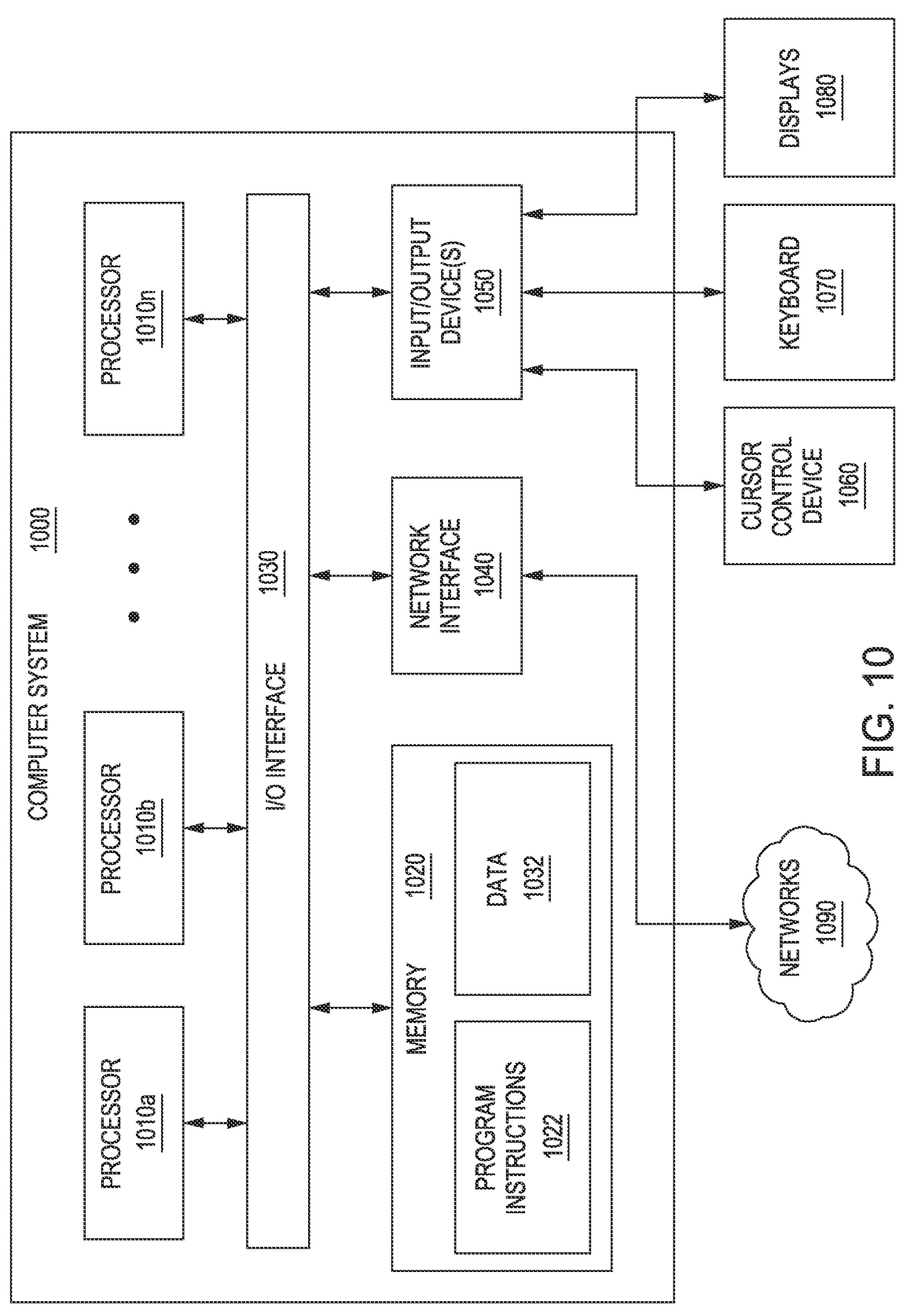
FIG. 10 depicts a computer system that can be utilized in various embodiments of the present invention to implement the computing device according to one or more embodiments.

FIG. 10 depicts a computer system 1000 that can be utilized in various embodiments of the present invention to implement the computing device 100, according to one or more embodiments.

Various embodiments of a reconfigurable, hyperdimensional neural network architecture, as described herein, may be executed on one or more computer systems, which may interact with various other devices. One such computer system is computer system 1000 illustrated by FIG. 10, which may in various embodiments implement any of the elements or functionality illustrated in FIGS. 1 through 8. In various embodiments, computer system 1000 may be configured to implement methods and functions described above. The computer system 1000 may be used to implement any other system, device, element, functionality or method of the above-described embodiments. In the illustrated embodiments, computer system 1000 may be configured to implement the edge device 100 and implement the reconfigurable, hyperdimensional neural network architecture functions as processor-executable executable program instructions 1022 (e.g., program instructions executable by processor(s) 1010) in various embodiments.

In the illustrated embodiment, computer system 1000 includes one or more processors 1010a-1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, computer system 1000 may be any of various types of devices, including, but not limited to, a personal computer system, desktop computer, laptop, notebook, tablet or netbook computer, mainframe computer system, handheld computer, workstation, network computer, IoT sensor device, a camera, a set top box, a mobile device, a consumer device, application server, storage device, a peripheral device such as a switch, modem, router, or in general any type of computing or electronic device.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example: via digital fiber communications networks: via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the operations and methods described above, such as the functions illustrated by the diagram of FIG. 2. The functional blocks of FIG. 2 may be implemented in the user device or may be implemented partially in the user device and partially in the server 122. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. An apparatus configured to process data using machine learning comprising:
   a feature extractor comprising a neural network configured to encode input information into hyperdimensional (HD) vectors and extract at least one particular HD vector representing at least one feature within the input information, wherein the neural network comprises no more than one multiply and accumulate operator at each layer of the neural network; and
   a classifier, coupled to the feature extractor, configured to classify the at least one particular HD vector to produce an indicium of classification for the particular HD vector and wherein the classifier does not comprise any multiply and accumulate operators.

2. The apparatus of claim 1, wherein the input information is video information.

3. The apparatus of claim 1, wherein the neural network comprises a plurality of artificial neurons, where each artificial neuron comprises a shift and accumulate operator.

4. The apparatus of claim 1, wherein the feature extractor comprises at least one long short-term memory (LSTM) cell, where the LSTM does not contain any multiply and accumulate operators.

5. The apparatus of claim 1, further comprising training the neural network separately from training of the classifier.

6. The apparatus of claim 1, further comprising a field programmable gate array or application specific integrated circuit having at least one processor and a memory, wherein the memory stores computer code to implement the feature extractor and classifier.

7. A method for processing information comprising:
   receiving input information;
   extracting at least one hyperdimensional (HD) vector representing at least one feature from the input information using a neural network, where the neural network comprises no more than one multiply and accumulate operator at each layer of the neural network; and
   classifying the at least one HD vector using a classifier, where the classifier does not comprise any multiply and accumulate operators.

8. The method of claim 7, wherein the input information is video.

9. The method of claim 7, wherein the neural network comprises a plurality of artificial neurons, where each artificial neuron comprises a shift and accumulate operator.

10. The method of claim 7, wherein extracting comprises utilizing at least one long short-term memory (LSTM) cell, where the LSTM does not contain any multiply and accumulate operators.

11. The method of claim 7, further comprising training the neural network separately from training of the classifier.

12. The method of claim 11, further comprising:
   training the neural network of the feature extractor;
   fixing weights and biases of the neural network; and
   training the classifier while the weights and biases are fixed in the neural network.

13. The method of claim 12, wherein training the first neural network comprises:
   coupling the neural network of the feature extractor to a training neural network;
   training the neural network of the feature extractor and training neural network;
   and
   coupling the neural network of the feature extractor to the classifier.

14. The method of claim 13, further comprising reconfiguring the classifier to recognize at least one additional classification, where reconfiguring comprises applying a new feature to the classifier, labelling a new classification for the new feature, and training the classifier to classify HD vectors using the new classification.

15. The method of claim 14, further comprising receiving the new feature, the new classification, or both via federated learning.

16. The method of claim 7, wherein the method is performed by either a field programmable gate array or application specific integrated circuit.

17. An apparatus comprising at least one processor and at least one non-transient computer readable media, where the at least one non-transient computer readable media stores instructions that, when executed by the at least one processor, causes the apparatus to perform operations comprising:

receiving input information;

extracting at least one hyperdimensional (HD) vector representing at least one feature from the input information using a neural network, where the neural network comprises no more than one multiply and accumulate operator at each layer of the first neural network; and classifying the at least one HD vector using a classifier to produce an indicium of classification for the at least one HD vector, where the classifier does not comprise any multiply and accumulate operators.

18. The apparatus of claim 17, wherein the input information is video.

19. The apparatus of claim 17, wherein the neural network comprises a plurality of artificial neurons, where each artificial neuron comprises a shift and accumulate operator.

20. The apparatus of claim 17, wherein extracting comprises utilizing at least one long short-term memory (LSTM) cell, where the LSTM cell does not contain any multiply and accumulate operators.

21. The apparatus of claim 17, further comprising training the neural network separately from training of the classifier.

22. The apparatus of claim 21, performing operations further comprising:

training the neural network;

fixing weights and biases of the neural network; and training the classifier while the weights and biases are fixed in the neural network.

23. The apparatus of claim 22, wherein training the neural network comprises:

coupling the neural network of the feature extractor to a training neural network;

training the neural network of the feature extractor and training neural network; and coupling the neural network to the classifier.

24. The apparatus of claim 23, further comprising reconfiguring classifier to recognize at least one additional classification, where reconfiguring comprises applying a new feature to the classifier, labelling a new classification for the new feature, and training the classifier to classify HD vectors using the new classification.

25. The apparatus of claim 24, further comprising receiving the new feature, the new classification, or both via federated learning.

26. The apparatus of claim 17, comprises a field programmable gate array or application specific integrated circuit.

27. An apparatus comprising a field programmable gate array or an application specific integrated circuit configured to process data using machine learning comprising:

a feature extractor comprising a neural network configured to encode input information into hyperdimensional (HD) vectors and extract at least one particular HD vector representing at least one feature within the input information, wherein the neural network comprises shift and accumulate operators using power of two weights, look up tables, and exclusive OR logic using no more than one multiply and accumulate operator in each layer of the neural network; and a classifier, coupled to the feature extractor, configured to classify the at least one particular HD vector and wherein the classifier comprises shift and accumulate operators using power of two weights, look up tables, and exclusive OR logic without using any multiply and accumulate operators.

28. The apparatus of claim 27, wherein the input information is video.

29. The apparatus of claim 27, wherein the feature extractor comprises at least one long-short term memory (LSTM) cell, where the LSTM comprises shift and accumulate operators using power of two weights and look up tables for providing sigmoid and tanh functions.

30. The apparatus of claim 27, further comprising a process in memory (PIM) architecture.

* * * * *